(12) United States Patent
Oh

(10) Patent No.: US 7,334,175 B2
(45) Date of Patent: Feb. 19, 2008

(54) METHOD FOR DRIVING RETRANSMISSION TIMER IN MOBILE TELECOMMUNICATIONS SYSTEM USING RADIO LINK PROTOCOL

(75) Inventor: Youn-Taek Oh, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 277 days.

(21) Appl. No.: 10/200,954

(22) Filed: Jul. 22, 2002

(65) Prior Publication Data
US 2003/0028837 A1    Feb. 6, 2003

(30) Foreign Application Priority Data
Jul. 20, 2001    (KR)    ............... 2001-43728

(51) Int. Cl.
G08C 25/02    (2006.01)
H04L 1/18    (2006.01)

(52) U.S. Cl. ..................... 714/748; 714/749

(58) Field of Classification Search ........ 714/748–751, 714/708
See application file for complete search history.

(56) References Cited

U.S. PATENT DOCUMENTS 5,774,479 A * 6/1998 Lee et al. ................ 714/749
6,076,181 A * 6/2000 Cheng ..................... 714/748
6,226,301 B1 * 5/2001 Cheng et al. ............. 370/474
6,408,003 B1 * 6/2002 Rezaiifar et al. ......... 370/394

OTHER PUBLICATIONS

Paxson et al., Computing TCP's Retransmission Timer, Oct. 1999, Internet Engineering Task Force. pp. 1-5.*
Paxson et al., Computing TCP's Retransmission Timer, Nov. 2000, Internet Engineering Task Force, pp. 1-7.*

* cited by examiner

Primary Examiner—Cynthia Britt
Assistant Examiner—John J. Tabone, Jr.
(74) Attorney, Agent, or Firm—The Farrell Law Firm, PC

(57) ABSTRACT

A method for driving a retransmission timer in a mobile telecommunications system using a radio link protocol. A mobile telecommunications system receives a frame transmitted from a transmitter and, if the received frame is determined to be erroneous, requests the transmitter to retransmit the frame and drives a retransmission timer. In this case, there is a probability that the retransmission timer will be held. For this reason, the method for driving the retransmission timer minimizes that probability. Accordingly, the retransmission timer expires earlier by a period of time for which it is not held, thereby allowing subsequent operations in the mobile telecommunications system to be performed quickly and at an improved data rate.

1 Claim, 4 Drawing Sheets

METHOD FOR DRIVING RETRANSMISSION TIMER IN MOBILE TELECOMMUNICATIONS SYSTEM USING RADIO LINK PROTOCOL

PRIORITY

This application claims priority to an application entitled "Method for Driving Retransmission Timer in Mobile Telecommunication System Using Radio Link Protocol", filed in the Korean Industrial Property Office on Jul. 20, 2001 and assigned Serial No. 2001-43728, the contents of which are hereby incorporated by reference.

BACKGROUND OF THE INVENTION

1. Field of the Invention

The present invention relates to a method for driving a retransmission timer in a mobile telecommunications system using a radio link protocol (RLP).

2. Description of the Related Art

As well known to those skilled in the art, a radio link protocol employed in a general CDMA mobile telecommunications system utilizes an automatic repeat request (ARQ) technique based on a non-acknowledgement (NAK) to recover errors or erroneous frames generated in a wireless channel. The terms used in this application are as follows.

A control frame includes SYNC, SYNC/ACK, ACK, and NAK frames. The SYNC, the SYNC/ACK, and the ACK frames are used to initialize a RLP (3 Way Handshake Method). The NAK frame is used to request retransmission.

A data frame transmits data of an upper layer. The data frame includes a new data frame and a retransmitted frame. The new data frame receives data of the upper layer and the retransmitted frame retransmits the data in response to the NAK. An idle frame is transmitted in the case when no control frame or data frame is transmitted or when the control frame and the data frame can not be transmitted. An eraser frame is a frame broken or disrupted by noise on an air channel. A retransmission timer waits for arrival of the retransmitted frame after transmitting the NAK. The NAK ROUND means a time period until the retransmission timer is operated after transmitting the NAK, the retransmitted frame is received and the retransmission timer expires. In case that the NAK ROUND=2, a second NAK ROUND is performed in the case that the retransmitted frame is not received in a first NAK ROUND. A round trip delay (RTD period) is a value obtained in the RLP initialization and indicates a time taken in transmitting a RLP frame made in a transmitting RLP to a receiving RLP and returning again.

The order of priority of RLP for transmitting frames is as follows: First, the control frame (SYNC frame, SYNC/ACK frame, ACK frame), second, the retransmitted data frame; third, the new data frame; and fourth, the idle frame.

FIG. 1 is a timing diagram illustrating the operation of a conventional retransmission timer. The conventional ARQ technique will be briefly described with reference to FIG. 1. If there is an error in a data frame transmitted from a transmitter RLP, a receiver RLP requests the transmitter RLP to retransmit the frame. At this moment, the receiver RLP not only requests the retransmission, but also drives a retransmission timer. The retransmission timer is set to round trip delay (or a round trip time (RTT), referred to hereinafter as RTD) period plus a spare period.

The receiver RLP keeps decreasing the value of the retransmission timer until the corresponding frame is received. When a control frame, retransmitted frame or eraser frame is received while the value of the retransmission timer is being decreased, the receiver RLP will hold the retransmission timer.

Referring to FIG. 1, since the receiver RLP has received the retransmitted frame in response to the control frame (an NAK frame in FIG. 1) or a previous NAK frame, the receiver RLP holds the retransmission timer. Accordingly, an expiration time of the retransmission timer is lengthened by a time period as long as a period that is indicated with a dotted line. Note that frames received when the value of the retransmission timer is in the RTD period are frames that the transmitter RLP has transmitted irrespective of an NAK frame transmitted from the receiver RLP. Therefore, holding the retransmission timer when the value of the retransmission timer is in the RTD period causes an unnecessary delay in the expiration time of the retransmission timer.

The unnecessary delay as described above causes problems in that data transfer to the upper layer is delayed and the processing speed of applications is reduced.

SUMMARY OF THE INVENTION

Therefore, the present invention has been made in view of the above problems, and it is an object of the present invention to provide a method for driving a retransmission timer, in which the performance of the retransmission timer is improved by avoiding unnecessary delay of the expiration of the retransmission timer, thereby allowing subsequent operations in a telecommunications system to be performed quickly and at an improved data rate.

In accordance with one aspect of the present invention, the above and other objects can be accomplished by the provision of a method for driving a retransmission timer in a mobile telecommunications system using a radio link protocol, the method comprising the steps of receiving a frame transmitted from a transmitter, and, if the received frame is determined to be erroneous, requesting the transmitter to retransmit the frame and driving a retransmission timer; and driving the retransmission timer without holding it until a predetermined round trip delay period has elapsed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the accompanying drawings. In the following description, related functions and configurations that are known in the art are omitted for the sake of clearness of understanding the concept of the present invention, as such would obscure the description with unnecessary detail.

As apparent from the following description, when a receiver RLP drives a retransmission timer after transmitting an NAK frame to a transmitter RLP, it always decreases the value of the retransmission timer regardless of the type of frame transmitted from the transmitter RLP if the timer value is in an RTD period, leading to a quick expiration of the timer. Consequently, a delay in data transfer to an upper layer can be minimized.

Figure 1:
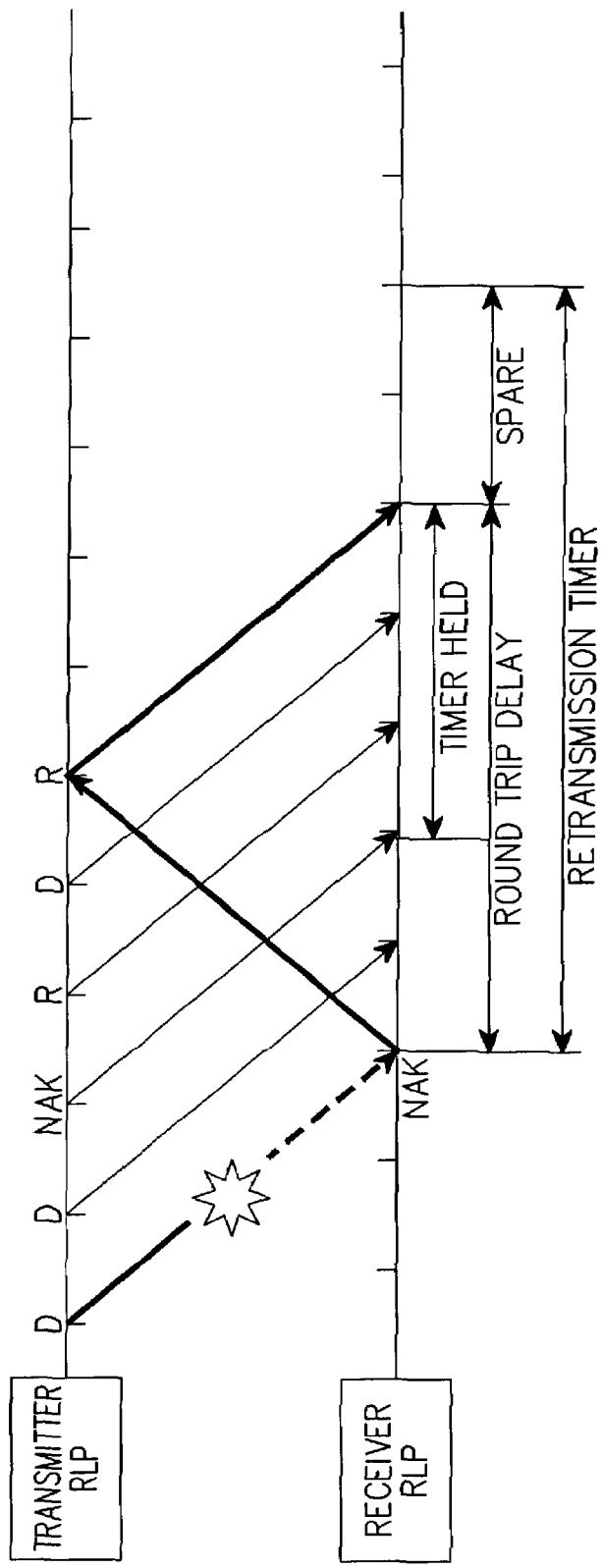
FIG. 1 is a timing diagram illustrating the operation of a conventional retransmission timer.
Figure 2:
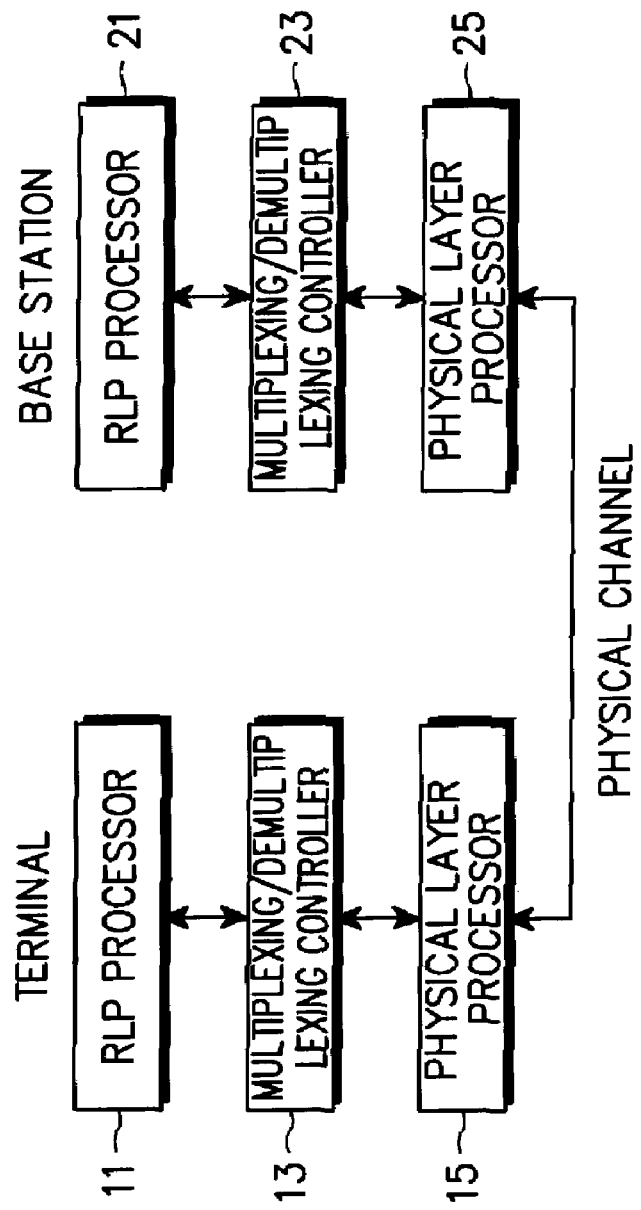
FIG. 2 is a block diagram illustrating the construction of an RLP-based data transmission/reception apparatus to which the present invention is applied.

FIG. 2 is a block diagram illustrating the construction of an RLP-based data transmission/reception apparatus to which the present invention is applied. Although not shown in FIG. 2, a terminal and a base station transmit/receive data to and from each other through a network protocol [TCP (Transmission Control Protocol)/IP (Internet Protocol)] processing unit and a link protocol [PPP (Point-to-Point Protocol)] processing unit between an application (for example, Web, Telnet or File Transmission Protocol (FTP) and each of RLP processors 11 and 21. In other words, data in upper service processing units are finally transferred in the form of a link protocol packet to a lower layer and the lower layer transmits the data by using a proper protocol.

Referring to FIG. 2, a physical layer processor 15 in the terminal and a physical layer processor 25 in the base station are interconnected via a physical channel according to the CDMA2000 standard. The physical layer processor 15 or 25 transmits an RLP frame transferred from the RLP processor 11 or 21 to the other physical layer processor 25 or 15 over the physical channel and transfers an RLP frame received over the physical channel to the corresponding RLP processor 11 or 21.

Multiplexing/demultiplexing controllers 13 and 23 each have a multiplexing function of appending information of the destination and size of the RLP frame transferred from the RLP processor 11 or 21 to a header thereof, and transferring it to the physical layer processor 15 or 25. The controllers 13 and 23 each have a demultiplexing function of identifying the destination and size of the RLP frame transferred by the physical layer processor 15 or 25, and transferring it to the upper RLP processor 11 or 21. The multiplexing/demultiplexing controllers 13 and 23 operate according to the CDMA2000 standard.

Data is transferred across the physical channel according to the CDMA2000 standard, with the RLP processor 11 or 21 performing initialization/reset procedures to obtain the value of a round trip delay period. The initialization/reset procedures are performed according to a RLP standard selected using the CDMA2000 standard. After finishing the initialization/reset procedures, the RLP processor 11 or 12 generates an RLP frame agreeing with a requested number and size whenever there is a request from the corresponding controller 13 or 23 and transfers the RLP frame to the controller 13 or 23. The multiplexing/demultiplexing controller 13 or 23 can send a request for an RLP frame to the RLP processor 11 or 21 at predetermined time intervals (for example, every 20 ms). The controller 13 or 23 writes necessary information in the RLP frame transferred from the RLP processor 11 or 21 for demultiplexing, and transfers it to the physical layer processor 15 or 25.

The physical layer processor 15 or 25 transfers received information to the multiplexing/demultiplexing controller 13 or 23 at each predetermined time interval (which is typically 20 ms). The multiplexing/demultiplexing controller 13 or 23 separates an RLP frame from the received information and transfers it to the RLP processor 11 or 21.

The RLP processor 11 or 21 performs is an analysis operation according to the RLP standard for the received RLP frame. According to the RLP standard, the RLP processor 11 or 21 generates segmented frames and analyzes them. In other words, if the size of a retransmitted frame to be transmitted exceeds the size limit of the multiplexing/demultiplexing controller 13 or 23, the RLP processor 11 or 21 transforms the frame into segmented frames and transfers them.

Figure 3:
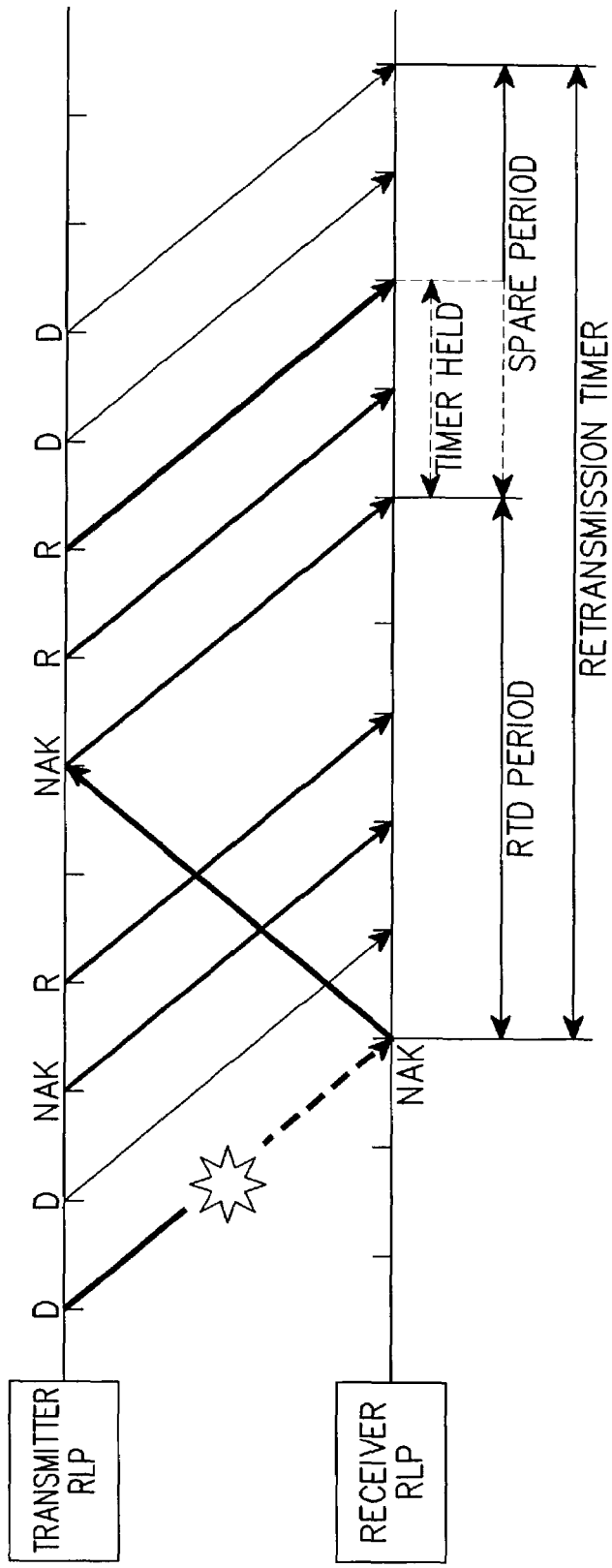
FIG. 3 is a timing diagram illustrating the operation of a retransmission timer in accordance with the present invention.

FIG. 3 is a timing diagram illustrating the operation of a retransmission timer in accordance with the present invention. In FIG. 3, the ✩symbol is an eraser frame, which represents a frame broken by noise on an air channel. D is a new data frame. R is a retransmitted frame. NAK is a NAK frame. The retransmission timer transmits the NAK frame and receives a corresponding retransmitted frame. In case the retransmission timer does not receive the corresponding retransmitted frame until the retransmission timer has expired, the retransmission timer retransmits the NAK frame and otherwise transmits to the upper layer.

The retransmission timer should be set as a larger value than a value of the round trip delay. That is, the value of retransmission timer is set as the value that a adds a spare period to the value of the round trip delay.

Round trip delay is obtained from RLP initialization, that is, the delay period from transmission of the NAK to receipt of the retransmitted frame.

Referring to FIG. 3, the receiver RLP keeps decreasing the value of the retransmission timer regardless of the type of frame received during the RTD period. The RTD, as described above, is a round trip delay of a frame between the transmitter RLP and receiver RLP. The RTD period represents a minimum period it takes the receiver RLP to transmit an NAK frame and to receive a retransmitted frame from the transmitter RLP. Note that any frame received, regardless of type, when the value of the retransmission timer is in the RTD period will be a frame that the transmitter RLP has transmitted irrespective of whether an NAK frame has been transmitted from the receiver RLP. On the other hand, frames received when the value of the retransmission timer is in the spare period (which is after the RTD period) are frames that the transmitter RLP may have transmitted in response to an NAK frame transmitted from the receiver RLP. Therefore, if the receiver RLP receives an NAK frame, a retransmitted frame or an eraser frame, the receiver RLP holds the retransmission timer as soon as the spare period is entered. If the receiver RLP receives a data frame or idle frame, the receiver RLP does not hold the timer and keeps decreasing the retransmission timer.

There are two cases where the retransmitted frame may not be received by the receiver RLP. One is where the transmitter RLP has not received the NAK frame generated by the receiver RLP. The other is where, even though the transmitter RLP had transmitted the retransmitted frame, the receiver RLP has not received the retransmitted frame. In the latter case, if the receiver RLP is receiving a frame having a lower priority than that of the retransmitted frame, the receiver RLP decreases the value of the retransmission timer. After the retransmission timer has expired, a subsequent operation, such as, for example, transmitting a new NAK frame to the transmitter RLP or collecting received data for transfer to an upper layer, is performed. Even though the receiver RLP has not received the retransmitted frame and has failed to recover the data, the data can be recovered in the upper layer.

Described in Table 1 is the operation of the retransmission timer according to the present invention.

TABLE 1

Operation of Retransmission Timer

| Type of Received Frame | Spare Period < Value of Retransmission Timer ≦ (RTD Period + Spare Period) | Value of Retransmission Timer ≦ Spare Period |
|---|---|---|
| Control Frame | Decrease | Hold |
| Retransmitted frame | Decrease | Hold |
| New Data Frame | Decrease | Decrease |
| Idle Frame | Decrease | Decrease |
| Eraser Frame | Decrease | Hold |

Figure 4:
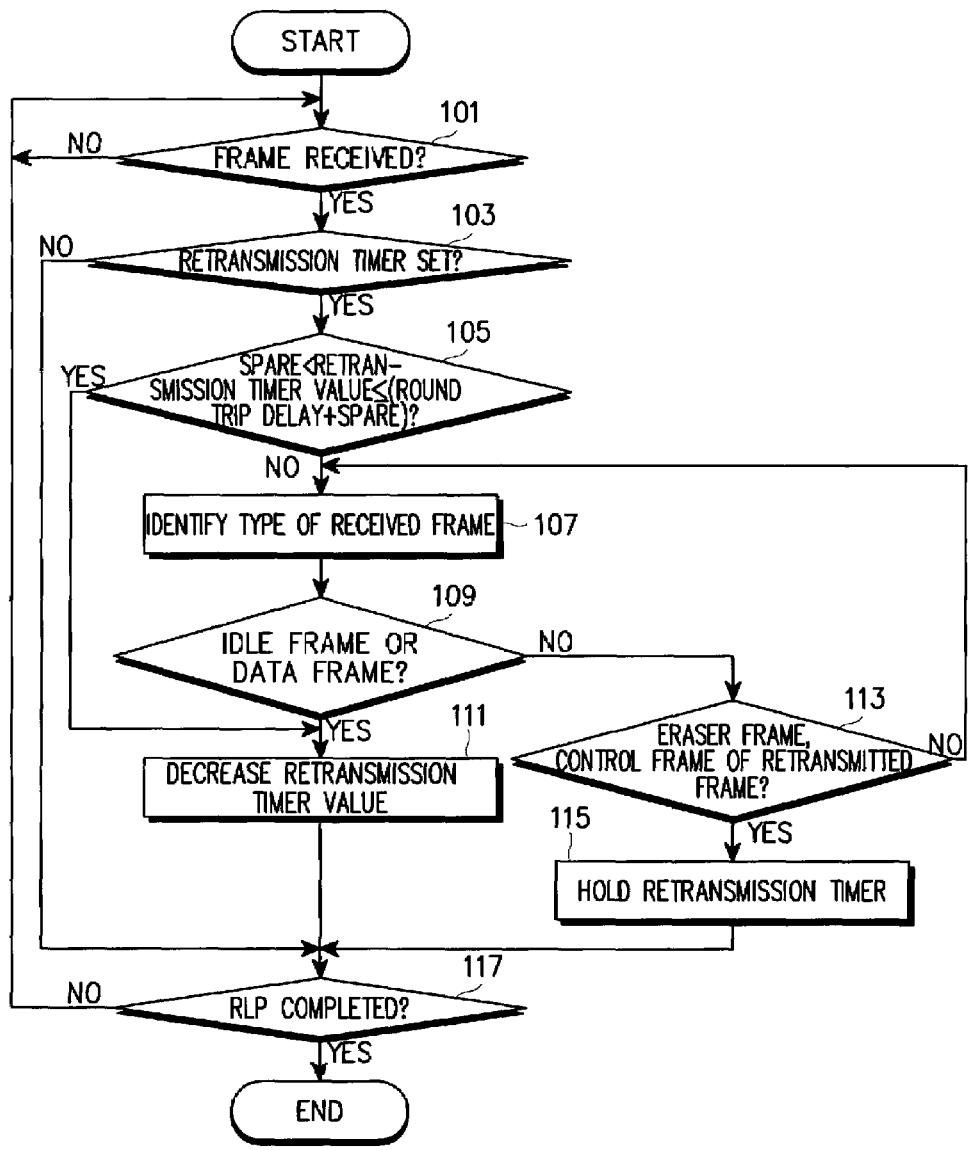
FIG. 4 is a flow chart illustrating control steps of driving the retransmission timer in accordance with the present invention.

FIG. 4 is a flow chart illustrating control steps of driving the retransmission timer in accordance with the present invention. The control steps of FIG. 4 are performed each time the receiver RLP receives a frame.

Referring to FIG. 4, when receiving a frame at step 101, the receiver RLP processor moves to step 103 to determine whether the retransmission timer is set. If the retransmission timer is set, the receiver RLP processor moves to step 105. In step 105, if the receiver RLP processor detects an unreceived frame, the receiver RLP processor will drive the retransmission timer and transmit an NAK frame to the transmitter RLP. Therefore, the receiver RLP processor determines whether the retransmission timer is set whenever the receiver RLP processor receives a frame, so that the operation of the retransmission timer can be controlled.

Then, the RLP processor determines whether the value of the retransmission timer is in the RTD period. This determination is accomplished by determining whether the value of the retransmission timer has exceeded the predetermined round trip delay period, i.e., reached a value that is equal or greater than the spare value. After transmitting the NAK frame, the receiver RLP sets the retransmission timer to an appropriate value and decreases the timer value until it reaches a zero (0) value, waiting for the arrival of a requested retransmitted frame. In other words, the value of the retransmission timer is gradually decreased from a value equal to the sum of the RTD period plus the spare period until it reaches a zero (0) value. Accordingly, if the value of the retransmission timer is greater than the spare value, the RLP processor determines that the retransmission timer value is in the RTD period. On the other hand, if the retransmission timer value is not greater than the spare value, the RLP processor determines that the retransmission timer value is in the spare period after the RTD period.

At step 105, if the value of the retransmission timer is greater than the spare value, the receiver RLP processor moves to step 111 to drive the retransmission timer without holding it, regardless of the received frame type. As shown in FIG. 3, when the value of the retransmission timer is in the RTD period, the RLP processor according to the present invention keeps decreasing the value of the retransmission timer without holding it, regardless of whether any frames are received from the transmitter RLP. During the initialization/reset procedures, the RLP processor 11 or 21 obtains the value for the round trip delay (RTD) period, which is the period for a round trip of a frame between the transmitter RLP and receiver RLP. This RTD period represents a minimum period that it takes for the transmission by the receiver RLP of an NAK frame and for the receipt of a retransmitted frame from the transmitter RLP. Accordingly, frames received when the value of the retransmission timer is in the RTD period are frames that the transmitter RLP has transmitted irrespective of any NAK frame that may have been transmitted from the receiver RLP. As a result, the present invention is constructed to drive the retransmission timer without holding it, regardless of the frame type, when the frame is received while the value of the retransmission timer is in the RTD period.

If the value of the retransmission timer is not greater than the spare value at step 105, the receiver RLP processor moves to step 107. In more detail, the receive RLP processor determines that the retransmission timer is in the spare period in FIG. 3 if the timer value is equal to or less than the spare value. Accordingly, frames when the value of the retransmission timer is in the spare period (i.e. after the RTD period) are frames that the transmitter RLP will have transmitted under influence of an NAK frame transmitted from the receiver RLP. Therefore, if the receiver RLP receives a data frame or idle frame, the receiver RLP keeps decreasing the retransmission timer without holding it. On the other hand, if the receiver RLP receives an NAK frame (or "control frame"), a retransmitted frame or an eraser frame, the receiver RLP holds the retransmission timer. If at step 105, the value of the retransmission timer is determined to be greater than or equal to the spare value, the receiver RLP processor moves to step 111.

The receiver RLP processor determines the type of the received RLP frame at step 107. As shown in Table 1, there are several types of the RLP frames, which include control frame, idle frame, data frame (including retransmitted frame) and eraser frame. After the type of the received RLP frame is determined, the RLP processor determines whether the received RLP frame is either an idle frame type or a data frame type, at step 109. If the received frame is the either of such frames, the RLP processor moves to step 111; and if the received frame is not one of such frames, the RLP moves to step 113. At step 111, the RLP processor keeps decreasing the value of the retransmission timer without holding it, and moves to step 117.

Meanwhile, the RLP processor determines whether the received RLP frame is one of an eraser frame, control frame and retransmitted frame at step 113. If the received frame is one of such frame types, the RLP processor moves to step 115 to hold the retransmission timer, then moves to step 117.

The RLP processor returns to step 101 if the RLP process is not completed at step 117. The control steps according to the present invention are performed whenever a frame is received during data transmission/reception on a RLP. The RLP processor performs the control steps every frame length, which is approximately every 20 ms.

As described above, the present invention can operate a retransmission timer efficiently in a telecommunications system using an RLP, thus minimizing a delay in data transfer to an upper layer. In other words, the value of the retransmission timer is decreased regardless of the type of a received frame when the retransmission timer is in an RTD period, thus the timer expires quickly and a delay in data transfer to an upper layer is minimized. Therefore, the present invention has the effect of improving the processing speed of applications.

Although the preferred embodiments of the present invention have been disclosed for illustrative purposes, those of ordinary skill in the art will appreciate that various modifications, additions and substitutions are possible, without departing from the scope and spirit of the invention as disclosed in the accompanying claims.

What is claimed is:

1. A method for driving a retransmission timer in a mobile telecommunications system using a radio link protocol, the method comprising the steps of:

receiving a frame transmitted from a transmitter and, if the received frame is determined to be erroneous, requesting the transmitter to retransmit the frame and driving the retransmission timer;

driving the retransmission timer, without holding the retransmission timer, until a predetermined round trip delay period has elapsed;

determining a frame type when a frame is received after the round trip delay period has elapsed;

holding or driving the retransmission timer according to the frame type;

if the frame type is any one of an idle frame type and a data frame type, driving the retransmission timer without holding the retransmission timer; and if the frame type is any one of an eraser frame type, a control frame type or a retransmitted frame type, holding the retransmission timer.

* * * * *